No. 653,497. Patented July 10, 1900.
J. BAKER.
PNEUMATIC TIRE.
(Application filed Apr. 9, 1900.)
(No Model.)
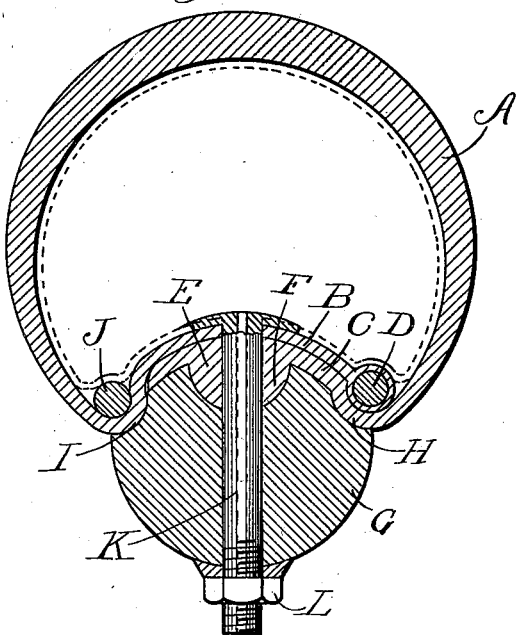
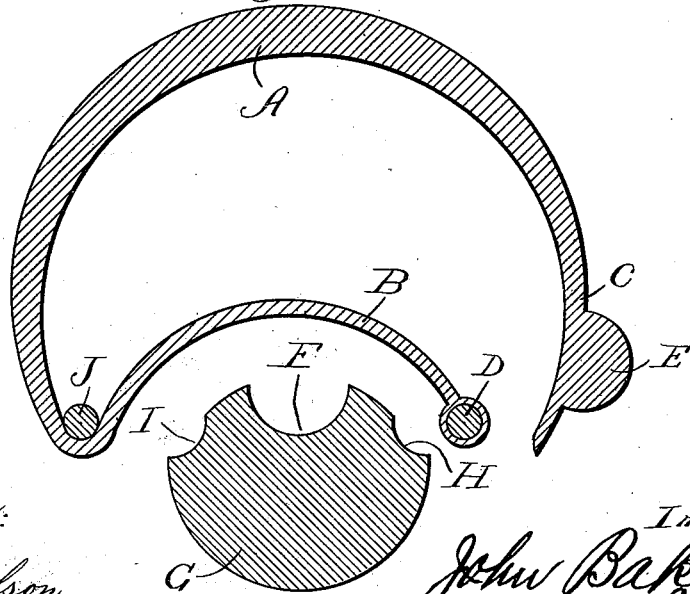
Witnesses:
E. F. Wilson.
W. B. Snowhook.
Inventor:
John Baker
By Rudolph Wm Lotz
Attorney.

UNITED STATES PATENT OFFICE.

JOHN BAKER, OF MEACHAM, ILLINOIS.

PNEUMATIC TIRE.

SPECIFICATION forming part of Letters Patent No. 653,497, dated July 10, 1900.

Application filed April 9, 1900. Serial No. 12,127. (No model.)

*To all whom it may concern:*

Be it known that I, JOHN BAKER, a citizen of the United States, residing at Meacham, in the county of Du Page and State of Illinois, have invented certain new and useful Improvements in Pneumatic Tires; and I do hereby declare the following to be a full, clear, and exact description of the invention, such as will enable others skilled in the art to which it appertains to make and use the same.

My invention relates to a novel construction in a pneumatic tire, the object being to provide a tire which can be easily removed and replaced for purposes of repair and which is simple and efficient; and it consists in the features of construction and combinations of parts hereinafter fully described and claimed.

In the accompanying drawings, illustrating my invention, Figure 1 is a transverse section of a tire and rim constructed in accordance with my invention, showing the tire inflated. Fig. 2 is a similar section showing the tire removed, but ready to be replaced on the rim.

In pneumatic tires the greatest difficulty is experienced in providing suitable means for readily removing the tire for purposes of repairing punctures and again replacing it. Many complicated devices for this purpose have been invented, but none has proved quite satisfactory, as all such tires required an inner inflating-tube, which is difficult to repair properly.

The ideal pneumatic tire is a single tube, which gives least trouble in repairing; but such tires have been difficult to seal air-tight where any means for detaching and opening same are provided. To overcome these difficulties and provide a simple detachable single-tube tire, I have designed the following:

My tire consists of an annular band A, the edge portions B and C of which form flaps which overlap each other to form an annular tube which is adapted to be inflated. Said edge B has an annular band of heavy wire D vulcanized therein, while said flap C is provided on its outer face with an annular shoulder E, the latter being adapted to fit within an annular groove F in the rim G. The latter is double convex in cross-section, its outer convex face being provided with said annular groove F at its middle portion and with grooves H and I on its sides, into which portions of the tire are adapted to be compressed, as hereinafter described. The said annular band D is of such diameter relatively to the diameter of the rim on the grooves H and I as to permit the insertion of part of the flap C between it and said groove, said portion being compressed into said groove by said band when the latter is in the position shown in Fig. 1. Said tube is adapted to contain a free annular band J, the latter being inserted in same when the tube is open by turning the edge C thereof back and over the rim G and passing it through said band J. Said band J is adapted to compress part of the flap C into the groove I, its diameter being the same relatively to said groove I as the band D is to the groove H. A tube K, containing a valve, is secured to said flap B and is adapted to pass through an opening in the flap C and its annular shoulder E and through an opening in the rim. The free end of said tube K is screw-threaded to receive a nut L, by means of which it is drawn down to hold the flaps B and C firmly upon the rim at this point.

To mount my tire on the rim, the flap C is first drawn over said rim until said flap B is practically in place on same, said band D preventing said flap B from passing completely over said rim. Said flap C is then inserted through said band J and then turned back and inserted through said band D underneath the flap B until the shoulder E is in place in said groove F in the rim, the part of the flap B adjacent the valve K being then moved outwardly to permit the end of said valve to be inserted through the opening in flap C. The tread portion M of the band A is then drawn outwardly, thereby moving the bands D and J sidewise until they press upon the flaps C and B, respectively. They may then be further pressed by the fingers until they compress the rubber into the grooves H and I and are in proper position. In this manner the tube formed is rendered air-tight, and by then inflating it the tire is complete. After inflation it will be obvious that the tendency of the tread portion to move outwardly will exert a side pressure upon the bands D and J, thus forcing same more firmly into the grooves H and I and securely holding them against displacement.

While I do not desire to use an inner tube and do not believe that it will be required, it may obviously be used, and I have therefore indicated same in dotted lines in Fig. 1.

If said tire should be punctured, I can obviously easily get at the punctured portion by withdrawing the portions of the flap C adjacent the punctured portion to provide an opening large enough to insert the hand, this being generally all that is required. Thus complete removal of the tire is unnecessary, except in case a large tear is to be repaired.

My tire and rim are easily made, the latter, owing to its form, being particularly strong, durable, and simple, so that it is not very liable to break in case the tire should be punctured.

I claim as my invention—

1. In a tire, the combination with a rim provided with an outer convex face having a central annular and annular side grooves, of an open tube adapted to be mounted thereon, said tube comprising a tread portion and two annular flaps adapted to overlap each other on the rim, one of said flaps being provided with an annular shoulder adapted to fit within said central annular groove in said rim, and the other of said annular flaps being provided in its edge with an annular metal band adapted to compress a portion of said first-named flap into one of said side grooves in said rim, and a free annular band contained within said tire and adapted to engage and compress a portion of said last-named flap into said other side groove of said rim.

2. In a tire, the combination with a rim provided with an outer laterally-convex face having an annular middle groove, of a tire comprising a band the edge portions of which form overlapping flaps, one of said flaps being provided with an annular shoulder adapted to enter said groove in said rim, an annular metallic band mounted in the edge of said other flap and being of less diameter than the greatest diameter of said rim and adapted to engage and compress said first-named flap against said rim, and a free annular band of less diameter than the greatest diameter of said rim within said tire adapted to engage and compress said last-named flap against said rim.

3. In a tire, the combination with a rim provided with an outer laterally-convex face having a central annular groove and annular side grooves, of a tire comprising an open tube the edge portions of which form overlapping flaps, one of said flaps being adapted to rest upon said rim and being provided with an annular shoulder adapted to fit said annular groove, devices carried by said other flap and adapted to engage and compress part of said first-named flap into one of said side grooves, and devices freely movable within said tire and adapted to be engaged thereby to compress a portion of said last-named flap into said other side groove when said tire is inflated.

In testimony whereof I affix my signature in presence of two witnesses.

JOHN BAKER.

Witnesses:
RUDOLPH WM. LOTZ,
WM. B. SNOWHOOK.